(12) United States Patent
Koga

(10) Patent No.: US 8,443,690 B2
(45) Date of Patent: May 21, 2013

(54) SPEED REDUCTION DEVICE FOR POWER SEAT

(75) Inventor: Yoshitaka Koga, Chiryu (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 456 days.

(21) Appl. No.: 12/835,296

(22) Filed: Jul. 13, 2010

(65) Prior Publication Data

US 2011/0023643 A1 Feb. 3, 2011

(30) Foreign Application Priority Data

Jul. 31, 2009 (JP) ................................ 2009-178720

(51) Int. Cl.
*F16H 1/16* (2006.01)
*F16H 1/20* (2006.01)
*B60N 2/02* (2006.01)
*B60N 2/48* (2006.01)

(52) U.S. Cl.
USPC ....................................... 74/425; 297/362.11

(58) Field of Classification Search
USPC .. 74/425, 421 A; 297/362.11, 362.12; 310/75 R, 83, 89, 91
See application file for complete search history.

(56) References Cited

U.S. PATENT DOCUMENTS

| | | | | |
|---|---|---|---|---|
| 4,962,963 A | * | 10/1990 | Robinson | 297/362.11 |
| 5,199,764 A | * | 4/1993 | Robinson | 297/362.11 |
| 6,162,142 A | * | 12/2000 | Hori et al. | 475/149 |
| 6,712,727 B2 | * | 3/2004 | Kujira et al. | 475/149 |
| 7,041,024 B2 | * | 5/2006 | Becker et al. | 475/162 |
| 7,548,001 B2 | * | 6/2009 | Macaire | 310/71 |
| 2009/0206644 A1 | * | 8/2009 | Ishii et al. | 297/362 |

FOREIGN PATENT DOCUMENTS

| | | |
|---|---|---|
| DE | 197 09 852 A1 | 9/1998 |
| DE | 103 27 103 A1 | 12/2004 |
| DE | 20 2008 016 335 U1 | 3/2009 |
| JP | 10-147164 | 6/1998 |

OTHER PUBLICATIONS

Extended European Search Report issued Jan. 3, 2011, in Patent Application No. 10169349.7.
U.S. Appl. No. 12/748,708, filed Mar. 29, 2010, Yoshitaka Koga, et al.

* cited by examiner

*Primary Examiner* — Justin Krause
(74) *Attorney, Agent, or Firm* — Oblon, Spivak, McClelland, Maier & Neustadt, L.L.P.

(57) ABSTRACT

A speed reduction device for a power seat includes a worm gear, a helical gear, a casing including a casing body and a casing cover, and a motor fixation device. The motor fixation device includes a first fitting portion provided at a housing, a first engagement portion formed at the first fitting portion, a second fitting portion formed at the casing body and to which the first fitting portion is fitted, a second engagement portion formed at the second fitting portion and arranged to overlap the first engagement portion in a direction perpendicular to the output shaft of the motor in a case where the first fitting portion is fitted to the second fitting portion, and an engagement projection formed at the casing cover and engaging with the first engagement portion and the second engagement portion in a case where the casing cover is tightened to the casing body.

14 Claims, 7 Drawing Sheets

F I G. 1
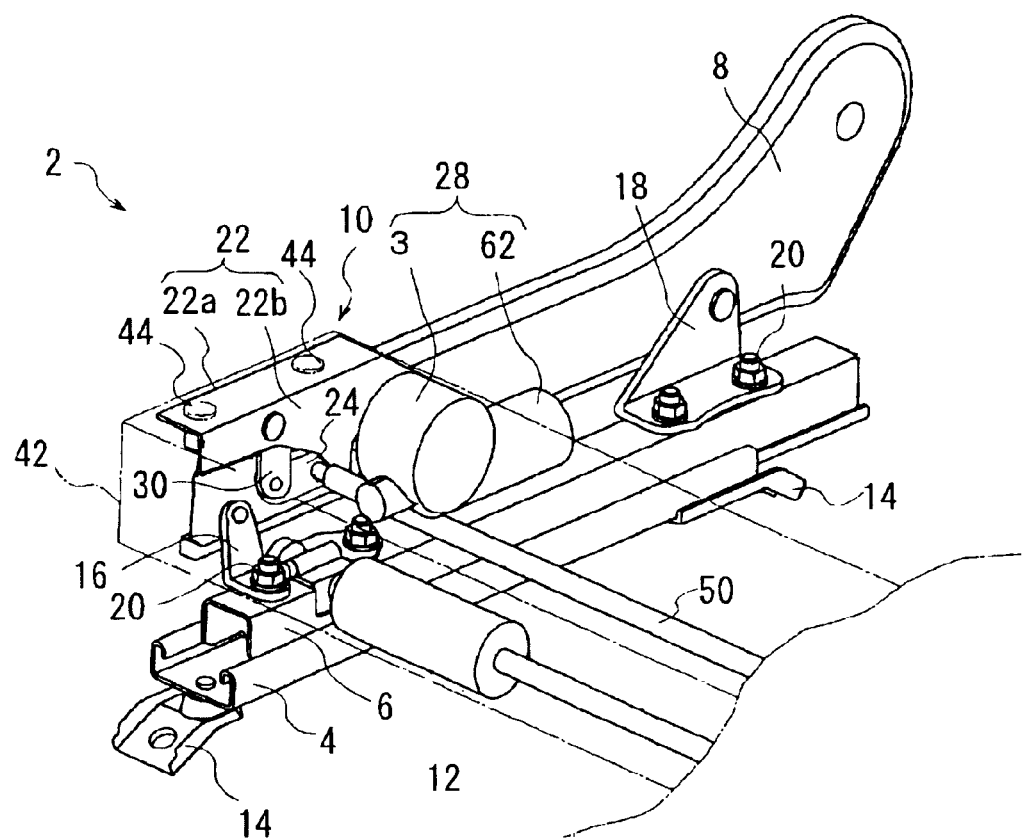

SPEED REDUCTION DEVICE FOR POWER SEAT

CROSS REFERENCE TO RELATED APPLICATIONS

This application is based on and claims priority under 35 U.S.C. §119 to Japanese Patent Application 2009-178720, filed on Jul. 31, 2009, the entire content of which is incorporated herein by reference.

TECHNICAL FIELD

This disclosure relates to a speed reduction device for a power seat.

BACKGROUND DISCUSSION

A known power seat apparatus for a vehicle includes a speed reduction device that reduces a rotational speed of an output shaft of a drive source such as an electric motor and then transmits the resulting rotational speed (i.e., the rotation) to a drive shaft driving a movable portion of the power seat. DE10327103A1 (hereinafter referred to as Reference 1) discloses such speed reduction device. According to Reference 1, an electric motor (motor) includes two attachment portions where through-holes are formed respectively. Two screws are inserted into the respective through-holes so as to be meshed with respective internal threads provided at a gear reduction box. As a result, the motor is securely fixed to the gear reduction box.

In addition, according to JPH10-147164A (hereinafter referred to as Reference 2), an output shaft of an electric motor (motor) and a reducer portion provided within a casing are connected to each other by means of a cable to thereby transmit a driving force of the motor to the reducer portion. The motor is securely fixed to a slide bracket via two screws and the casing is also fixed to the slide bracket via two screws.

According to Reference 1, the two screws are necessary to fix the motor to the gear reduction gearbox. In addition, the internal threads formed at the gear reduction gearbox and tightening of the two screws may lead to an increase of a manufacturing cost. Further, according to Reference 2, the two screws are required and tightened to fix the motor to the slide bracket, which may also lead to an increase of a manufacturing cost.

A need thus exists for a speed reduction device for a power seat which is not susceptible to the drawback mentioned above.

SUMMARY

According to an aspect of this disclosure, a speed reduction device for a power seat adapted to be fixed to a seat frame includes a worm gear coaxially and integrally rotating with an output shaft of a motor, a helical gear meshed with the worm gear and coaxially and integrally rotating with a drive shaft driving a movable portion of the power seat, a casing including a casing body rotatably supporting the worm gear and including a circular-shaped opening portion through which the helical gear is inserted, the casing including a casing cover tightened to the casing body and closing the opening portion of the casing body, the casing being fixed to a housing of the motor, and a motor fixation device. The motor fixation device includes a first fitting portion provided at the housing and surrounding the output shaft of the motor, a first engagement portion formed at the first fitting portion in a direction perpendicular to the output shaft of the motor, a second fitting portion formed at the casing body and to which the first fitting portion is fitted, a second engagement portion formed at the second fitting portion in a direction perpendicular to the output shaft of the motor and arranged to overlap the first engagement portion in a direction perpendicular to the output shaft of the motor in a case where the first fitting portion is fitted to the second fitting portion, and an engagement projection formed at the casing cover and engaging with the first engagement portion and the second engagement portion in a case where the casing cover is tightened to the casing body.

BRIEF DESCRIPTION OF THE DRAWINGS

The foregoing and additional features and characteristics of this disclosure will become more apparent from the following detailed description considered with the reference to the accompanying drawings, wherein:

FIG. 1 is a perspective view of a seat apparatus for a vehicle equipped with a seat tilt apparatus including a speed reduction device according to a first embodiment disclosed here;

DETAILED DESCRIPTION

Figure 2:
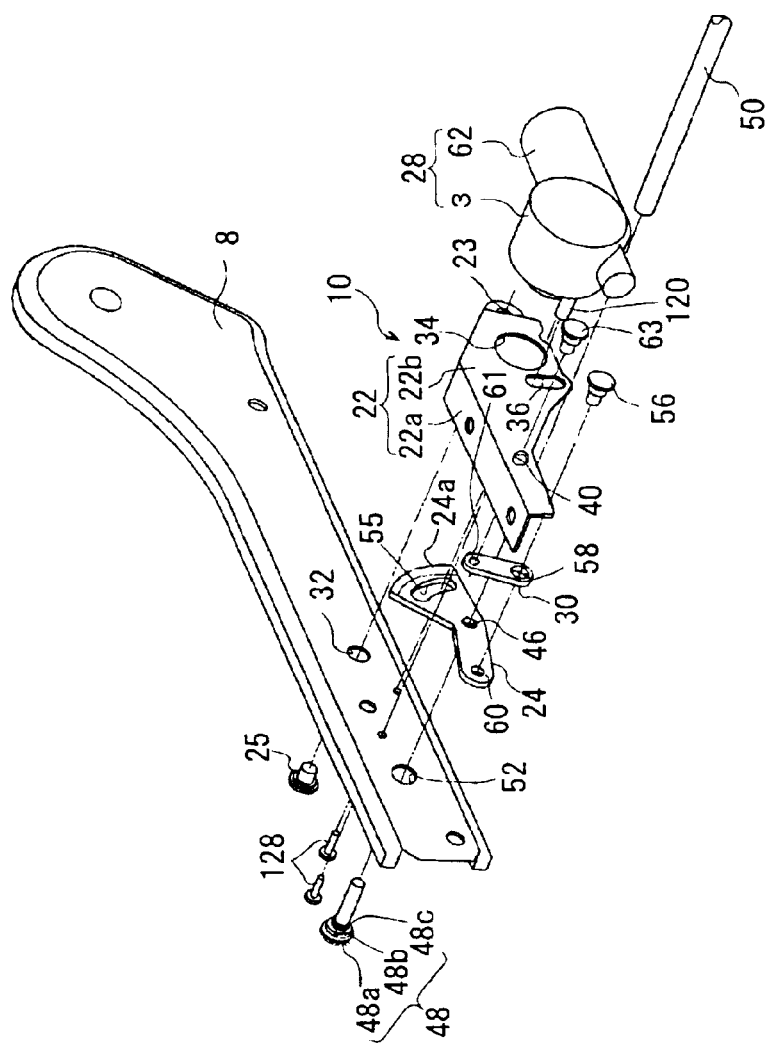
FIG. 2 is an exploded perspective view of the seat apparatus according to the first embodiment disclosed here.

A speed reduction device according to a first embodiment applied to a seat tilt apparatus for a vehicle seat apparatus will be explained. In the following, directions and orientations such as front and rear (i.e., a longitudinal direction), left and right (i.e., a width direction), and top and bottom correspond to those when viewed from a passenger seated on a seat (i.e., a power seat) for a vehicle. Further, in the following, the seat tilt apparatus provided at a right side of the seat will be mainly explained as an example.

As illustrated in FIG. 1, a seat apparatus 2 for a vehicle includes a lower rail 4, an upper rail 6, a lower arm 8 serving as a seat frame and at which a seat cushion is mounted, and a seat tilt apparatus 10. The seat tilt apparatus 10 includes a drive motor unit 28, which includes a speed reduction device 3. According to the seat apparatus 2, the lower rail 4 that extends in a longitudinal direction of the vehicle is fixed to a floor 12 for a vehicle via brackets 14. The upper rail 6 is slidably assembled on the lower rail 4. A relative sliding of the upper rail 6 to the lower rail 4 is changeable between a locked state and an unlocked state by a locking mechanism. The lower arm 8 is assembled on an upper portion of the upper rail 6 by bracket members 16, 18, bolts and nuts 20, and the like. An upper arm of a seat back is assembled on an upper rear portion of the lower arm 8 via a reclining mechanism so as to be rotatable relative to the lower arm 8.

The seat tilt apparatus 10 is mounted at a front portion of the lower arm 8 in the longitudinal direction. As illustrated in FIGS. 1 and 2, the seat tilt apparatus 10 includes a side frame plate 22, a sector gear 24, a pinion gear 26 (see FIG. 3) meshed with an external gear 24a formed at a first end of the sector gear 24, the drive motor unit 28 driving the pinion gear 26, and a swing link member 30 connected to a second end of the sector gear 24. The side frame plate 22 includes a top plate portion 22a and a side plate portion 22b bending to form an angle therebetween. The side frame plate 22 is pivotally supported by the lower arm 8 at a rotation center bore 23 formed at a rear end of the side plate portion 22b. That is, a fitting screw 25 is inserted into the rotation center bore 23 of the side frame plate 22 and a fitting bore 32 formed at the lower arm 8. As illustrated in FIG. 2, the side plate portion 22b includes a through-hole 34 into which the pinion gear 26 is inserted, en elongated hole 36 into which one of a pair of support projections 120 (which will be explained later) provided to attach the drive motor unit 28 to the lower arm 8 is inserted, and a pivot bore 40 through which a support screw 63 is inserted so that the support screw 63 engages with one end portion (i.e., a support hole 61) of the swing link member 30.

As illustrated in FIG. 1, a front edge panel 42 serving as a movable portion of the power seat is fixed to the top plate portion 22a of the side frame plate 22 by rivets 44. Alternatively, the front edge panel 42 may be directly formed at the side frame plate 22. The front edge panel 42 constitutes a portion of a cushion frame to which a lower surface of the seat cushion is fixed.

A rotation center hole 46 is formed at a center of the sector gear 24 as illustrated in FIG. 2. The external gear 24a having an arc shape and meshed with the pinion gear 26 is formed at the first end of the sector gear 24. In addition, an operation hole 60 is formed at the second end of the sector gear 24 so as to be connected to the swing link member 30. Further, a guide groove 55 is formed at the sector gear 24 so as to extend along the external gear 24a having the arc shape. One of the support projections 120 is inserted into the guide groove 55 to thereby guide the swing operation of the sector gear 24. A fixed screw 48, which includes a flange portion 48a, a peripheral smooth portion 48b and a serration portion 48c in the above mentioned order from a base portion, is inserted into the rotation center hole 46 in such a manner that the serration portion 48c is assembled on the rotation center hole 46 without relatively rotating thereat. The serration portion 48c of the fixed screw 48 is further fitted to an end portion of a drive transmission rod 50 in such a manner that the fixed screw 48 is prevented from rotating relative to the drive transmission rod 50. The drive transmission rod 50 transmits a drive torque to another seat tilt apparatus that is provided at a left side of the seat and that includes a lifter link member, a swing link member, a side frame plate, and the like. The peripheral smooth portion 48b of the fixed screw 48 is pivotally supported by a fitting hole 52 of the lower arm 8.

As illustrated in FIG. 2, the swing link member 30 includes a connection hole 58 at the other end and the support hole 61 at one end. A connection screw 56 is inserted into the connection hole 58 in addition to the operation hole 60 formed at the second end of the sector gear 24 so that the sector gear 24 and the swing link member 30 are connected in a relatively rotatable manner. The support hole 61 formed at one end of the swing link member 30 is connected to the pivot bore 40 of the side frame plate 22 by the support screw 63 so that the swing link member 30 is rotatable relative to the side frame plate 22.

Figure 3:
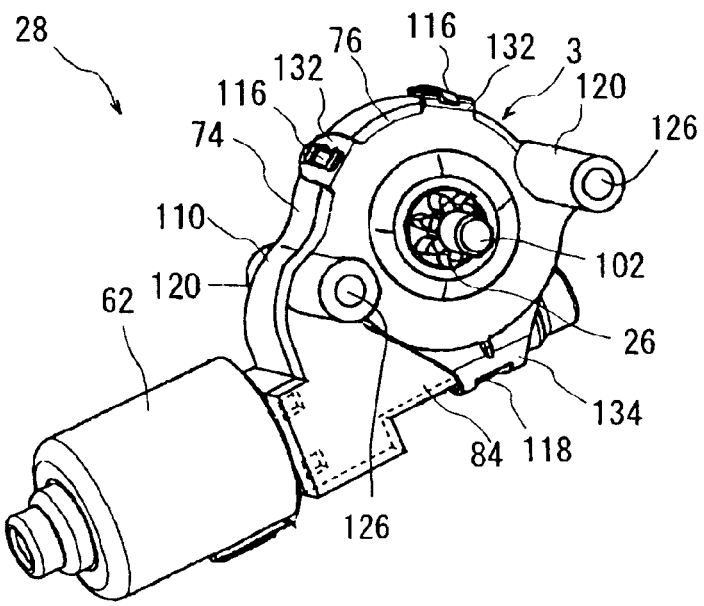
FIG. 3 is a perspective view of a motor drive unit of the seat tilt apparatus according to the first embodiment disclosed here.
Figure 4:
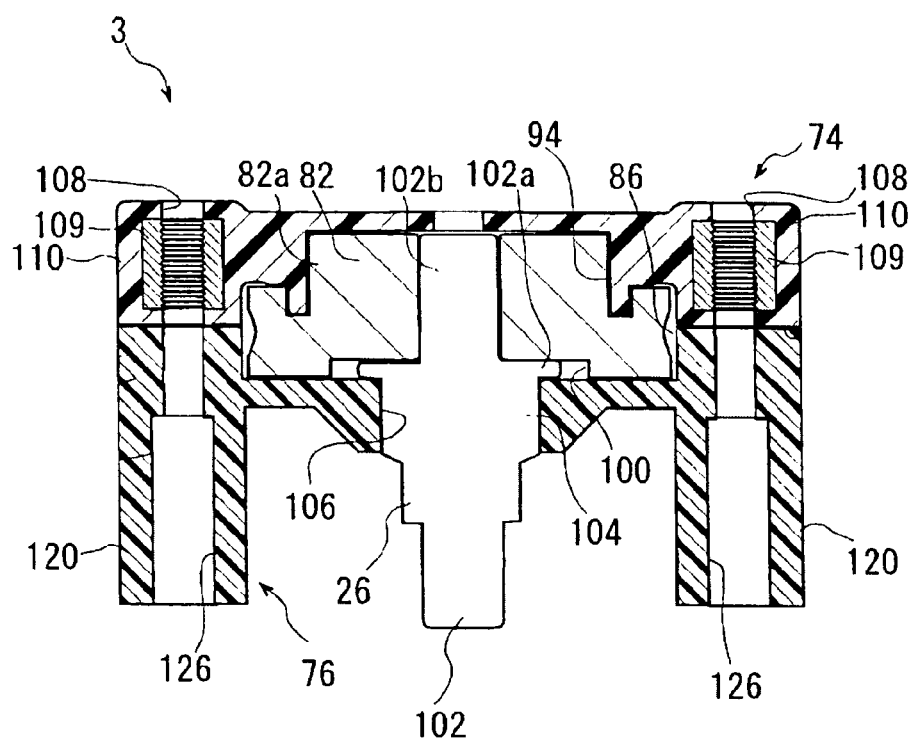
FIG. 4 is a cross-sectional view of the speed reduction device according to the first embodiment disclosed here.

As illustrated in FIGS. 1 to 3, the drive motor unit 28 includes an electric motor (motor) 62 and the speed reduction device 3. The drive motor unit 28 includes two of the support projections 120 projecting towards the lower arm 8 in a state where the drive motor unit 28 is assembled onto the seat apparatus 2. As illustrated in FIGS. 2 and 4, in a state where respective end surfaces of the support projections 120 are in contact with an inner side surface of the lower arm 8, screw members 128 are inserted from an outer side surface of the lower arm 8 into guide holes 126 formed at the support projections 120 respectively. The screw members 128 are meshed and tightened with internal thread members 109 that are formed at a casing body 74 so as to be arranged in the vicinity of respective end portions of the guide holes 126. As a result, the drive motor unit 28 is fixed to the lower arm 8. The internal thread members 109 are made of metal and are provided at screw clamp holes 108 of the casing body 74 by insert molding.

Figure 5:
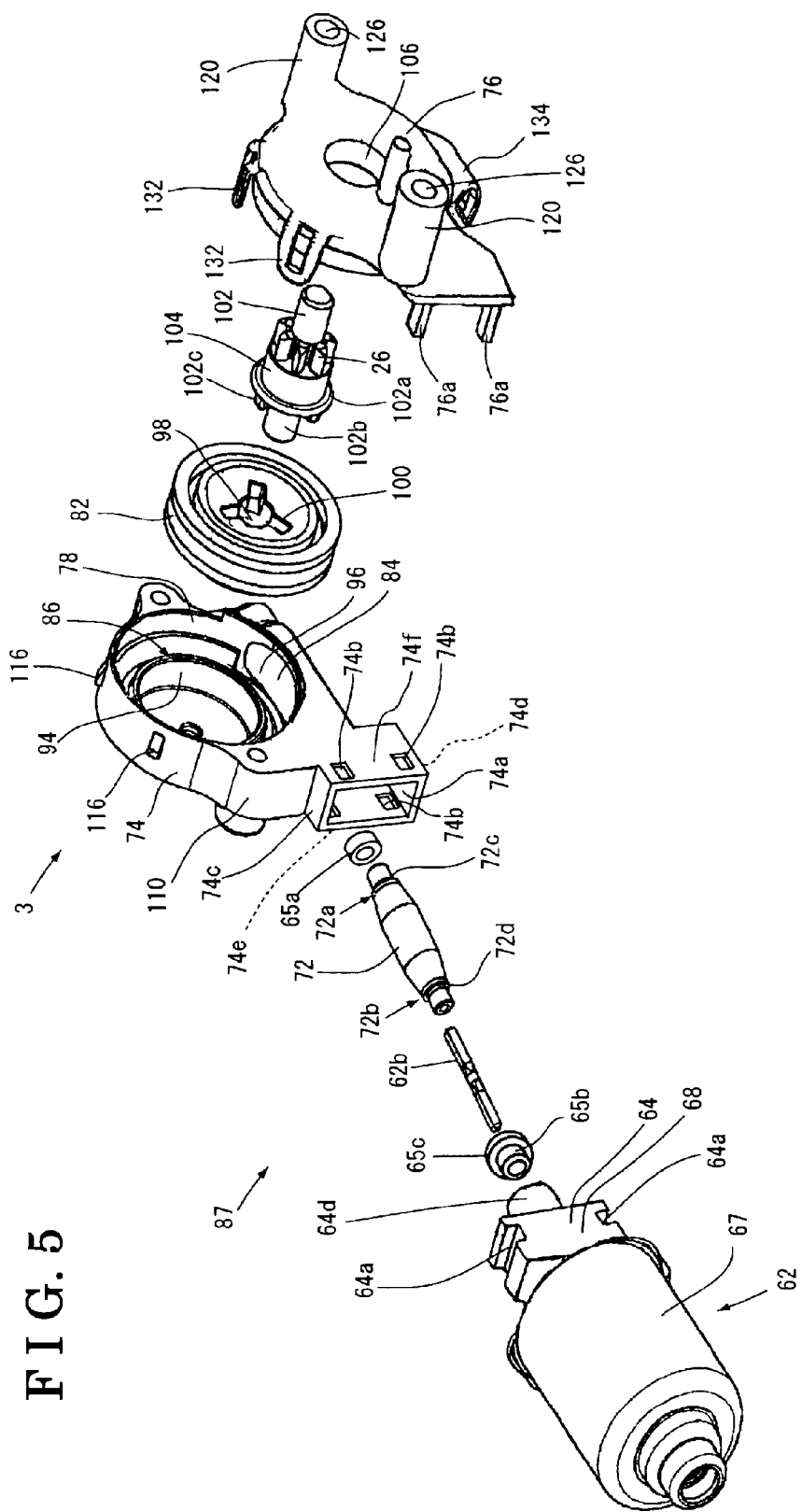
FIG. 5 is an exploded perspective view of the speed reduction device according to the first embodiment disclosed here.

As illustrated in FIG. 5, the motor 62 and the speed reduction device 3 are fixed to each other by a motor fixation device 87 according to the present embodiment. The motor 62 includes a yoke portion 67 formed by a coil, or the like and a housing 68. The housing 68 is a member to support the yoke portion 67. The housing 68 includes a first fitting portion 64 serving as a fitting protrusion.

The motor fixation device 87 includes the first fitting portion 64 provided at the housing 68 and first engagement portions 64a (in FIG. 5, upper and lower first engagement portions 64a) formed at the first fitting portion 64. The motor fixation device 87 also includes a second fitting portion 74a formed at the casing body 74 and second engagement portions 74b (in FIG. 5, two upper second engagement portions 74b and two lower second engagement portions 74b) formed at the second fitting portion 74a. The second fitting portion 74a serves as a fitting hole. The motor fixation device 87 further includes engagement projections 76a (in FIG. 5, upper and lower engagement projections 76a) for preventing the first fitting portion 64 from disengaging from the second fitting portion 74a in a direction along an output shaft 62a of the motor 62 in a state where the first fitting portion 64 is fitted to the second fitting portion 74a. The upper engagement projection 76a formed at a casing cover 76 is inserted, in a direction perpendicular to the output shaft 62a of the motor 62, into the two upper second engagement portions 74b and the upper first engagement portion 64a that are arranged so as to overlap each other in the direction perpendicular to the output shaft 62a of the motor 62 (i.e., in a horizontal direction). In the same way, the lower engagement projection 76a formed at the casing cover 76 is inserted, in a direction perpendicular to the output shaft 62a of the motor 62, into the two lower second engagement portions 74b and the lower first engagement portion 64a that are arranged so as to overlap each other in the direction perpendicular to the output shaft 62a of the motor 62.

Figure 6:
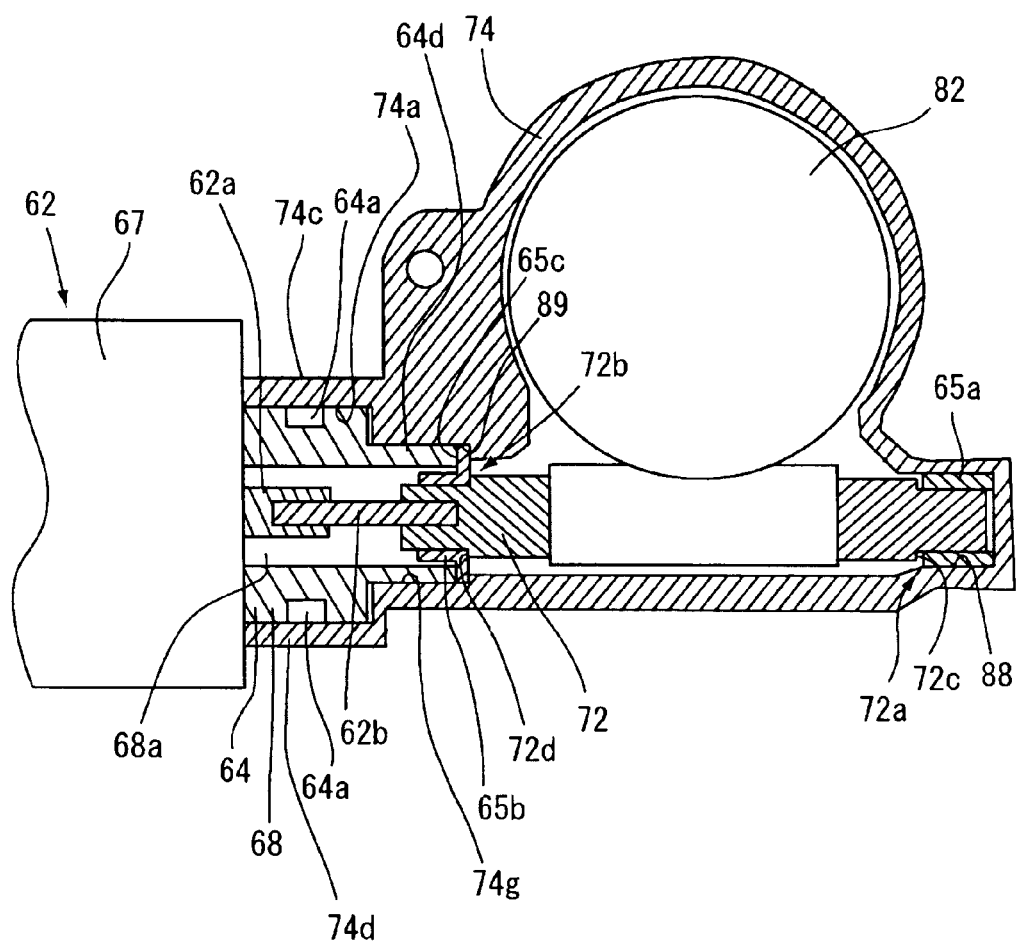
FIG. 6 is a cross-sectional view of a motor fixation device according to the first embodiment disclosed here.

As illustrated in FIG. 5, the first fitting portion 64 has a substantially rectangular solid shape while forming a cylindrical void portion 68a surrounding the output shaft 62a of the motor 62 as in a cross-sectional view of the motor fixation device 87 in FIG. 6. Top and bottom surfaces of the first fitting portion 64 are substantially in parallel to each other while first and second side surfaces along the output shaft 62a of the motor 62 are substantially in parallel to each other. The top, bottom, first and second side surfaces of the first fitting portion 64 are fitted to an inner surface of the second fitting portion 74a in such a manner that respective gaps between the first fitting portion 64 and the second fitting portion 74a in a vertical direction and a horizontal direction are small. Accordingly, the positioning of the motor 62 relative to the casing body 74 is accurately and easily conducted. The first fitting portion 64 may be fitted to the second fitting portion 74a in such a manner that the first and second side surfaces of the first fitting portion 64 are slightly press-fitted to the inner surface of the second fitting portion 74a, thereby also achieving the accurate and easy positioning of the motor 62 relative to the casing body 74.

A projecting end portion 64d is formed at an end surface of the first fitting portion 64 so as to project towards the casing body 74. The projecting end portion 64d serves as a cylindrical fitting portion coaxial with the output shaft 62a of the motor 62.

A worm gear 72 includes shaft portions at first and second ends (i.e., first and second shaft portions), respectively, where first and second stepped portions 72a and 72b are formed respectively as illustrated in FIGS. 5 and 6. The first stepped portion 72a arranged at right side in FIG. 6 includes a first contact surface 72c that extends perpendicular to a thrust shaft of the worm gear 72. The first contact surface 72c is in contact with an end surface of a first bearing member 65a facing the motor 62. Because of such contact, the worm gear 72 is prevented from moving in a direction away from the motor 62.

The second stepped portion 72b facing the motor 62 and arranged at a left side in FIG. 6 includes a second contact surface 72d that extends perpendicular to the thrust shaft of the worm gear 72. The second contact surface 72d is in contact with an end surface of a second bearing member 65b where a flange portion 65c is formed. The projecting end portion 64d of the first fitting portion 64 is in contact with an end surface of the flange portion 65c facing the motor 62 to thereby restrict the worm gear 72 from moving in a direction towards the motor 62.

Each of the first engagement portions 64a has a longitudinal portion perpendicular to the output shaft 62a of the motor 62 and forms a groove having a predetermined width. The upper and lower first engagement portions 64a are formed at upper and lower surfaces of the first fitting portion 64 so as to open in opposite directions from each other. Each of the first engagement portions 64a extends through the first side surface to the second side surface of the first fitting portion 64. A cross-sectional shape of the first fitting portion 64 perpendicular to the longitudinal direction of each of the first engagement portions 64a is a rectangular shape having openings at the upper surface and the lower surface respectively according to the present embodiment. Alternatively, the rectangular shape may have the opening formed at either the upper surface or the lower surface.

The second fitting portion 74a formed at the casing body 74 is formed, being surrounded by fitting walls 74c, 74d, 74e, and 74f at upper, lower, left and right sides (i.e., an upper wall 74c, a lower wall 74d, first and second vertical walls 74e and 74f). The second fitting portion 74a opens towards the motor 62. The second fitting portion 74a has a shape so that the first fitting portion 64 is fitted to the second fitting portion 74a. Specifically, the second fitting portion 74a has a void defined by the fitting walls 74c, 74d, 74e, and 74f to thereby form a substantially rectangular solid shape that is substantially the same as an outer shape of the first fitting portion 64.

As illustrated in FIG. 6, a fitting bore 74g serving as a cylindrical fitting hole is formed at an inner end portion of the second fitting portion 74a away from the motor 62 so as to receive the projecting end portion 64d of the first fitting portion 64. A gap between an inner periphery of the fitting bore 74g and an outer periphery of the projecting end portion 64d is defined to be slightly larger than a gap between an outer surface of the first fitting portion 64 and an inner surface of the second fitting portion 74a. Accordingly, a variation of positioning when the first fitting portion 64 is fitted to the second fitting portion 74a is absorbed, which leads to an assembly under various conditions. In addition, the projecting end portion 64d is fitted to the fitting bore 74g to thereby improve a support strength of the motor 62.

The projecting end portion 64d formed at the end surface of the first fitting portion 64 forms into a cylindrical shape having an opening at a side facing the casing body 74. An inner void of the projecting end portion 64d accommodates therein an end portion of the second end of the worm gear 72.

As illustrated in FIG. 5, the second engagement portions 74b are formed by penetrating through the first and second vertical walls 74e and 74f to form into rectangular shapes. Specifically, the upper and lower second engagement portions 74b are formed at upper and lower portions of the first vertical wall 74e respectively in a penetrating manner and in parallel to each other in the vertical direction. In the same way, the upper and lower second engagement portions 74b are formed at upper and lower portions of the second vertical wall 74f respectively in a penetrating manner and in parallel to each other in the vertical direction. In a case where the first fitting portion 64 is fitted to the second fitting portion 74a, the upper second engagement portions 74b formed at the upper portions of the respective first and second vertical walls 74e and 74f are arranged so as to overlap the upper first engagement portion 64a in the direction perpendicular to the output shaft 62a of the motor 62. In the same way, the lower second engagement portions 74b formed at the lower portions of the respective first and second vertical walls 74e and 74f are arranged so as to overlap the lower first engagement portion 64a in the direction perpendicular to the output shaft 62a of the motor 62.

The speed reduction device 3 mainly includes the casing body 74, the casing cover 76 covering an opening portion 78 of the casing body 74, the worm gear 72 arranged within the casing body 74 and connected to the output shaft 62a of the motor 62 by means of a cable 62b, the first and second bearing members 65a, 65b rotatably supporting the first and second shaft portions of the worm gear 72, and a helical gear 82 meshed with the worm gear 72.

As illustrated in FIG. 6, a first cable fitting hole is formed at an end portion of the output shaft 62a of the motor 62. In addition, a second fitting hole is formed at the second end of the worm gear 72. The cable 62b is disposed between the first and second fitting holes to connect the output shaft 62a of the motor 62 and the worm gear 72 to be rotatable as a unit.

The first and second bearing members 65a and 65b are disposed and fitted within first and second holes 88 and 89, respectively, formed at the casing body 74. The first and second holes 88 and 89 are processed at the same time by a step drill and the like from an opening side of the second fitting portion 74a. Therefore, the first and second holes 88 and 89 are formed to have high coaxiality to each other. An outer periphery of the first bearing member 65a is fitted to the first hole 88 while an outer periphery of the flange portion 65c of the second bearing member 65b is fitted to the second hole 89. The first and second bearing members 65a and 65b thus structured have highly accurate coaxiality to each other to thereby obtain a stable rotation of the worm gear 72. The casing body 74 and the casing cover 76 are formed by ABS resin, for example. The casing body 74 includes a worm gear receiving portion 84 and a helical gear receiving portion 86. In the above, the first and second holes 88 and 89 are processed by the drill and the like. Alternatively, when the casing body 74 is resin-molded, pins each processed into an axial hole shape may be placed in the resin mold and be removed after molding to thereby obtain the first and second holes 88 and 89.

The helical gear 82 is received in the helical gear receiving portion 86 in such a manner that an axis of the helical gear 82 is perpendicular to an axis of the worm gear 72. As illustrated in FIG. 4, a shaft portion 82a of the helical gear 82 formed at one surface thereof to project in a short-length column shape is rotatably supported by a body-side bearing portion 94 formed at the helical gear receiving portion 86.

An opening portion 96 is formed between the worm gear receiving portion 84 and the helical gear receiving portion 86 as illustrated in FIG. 5. The worm gear 72 and the helical gear 82 are meshed with each other in the opening portion 96. The helical gear 82 includes three engagement grooves 100 at equal distances around an axial center hole 98 of the helical gear 82. An output pinion gear 102 serving as a drive shaft is fitted, via a first end, to the axial center hole 98 and the engagement grooves 100 so that the output pinion gear 102 is prevented from rotating relative to the helical gear 82.

As illustrated in FIGS. 4 and 5, a flange portion 102a is formed substantially at a center of the output pinion gear 102 in an axial direction thereof along the circumferential direction so as to receive a thrust load of the helical gear 82. In addition, an insertion shaft 102b is formed at the first end of the output pinion gear 102 and three engagement fitting portions 102c are formed around the insertion shaft 102b at equal intervals along the flange portion 102a. The insertion shaft 102b is inserted into the axial center hole 98 of the helical gear 82 while the engagement fitting portions 102c engage with the respective engagement grooves 100 of the helical gear 82. Accordingly, the helical gear 82 and the output pinion gear 102 integrally rotate. The pinion gear 26 is formed at a shaft portion at a second end of the output pinion gear 102 and is meshed with the external gear 24a of the sector gear 24. A peripheral smooth shaft portion 104 is formed at an intermediate portion of the output pinion gear 102 thereof so as to be in contact with the flange portion 102a. Specifically, the peripheral smooth shaft portion 104 is formed next to the flange portion 102a at the second end of the output pinion gear 102. The output pinion gear 102 is rotatably supported by a cover-side bearing portion 106 of the casing cover 76 at the peripheral smooth shaft portion 104.

As illustrated in FIGS. 4 and 5, a pair of padding portions 110 is formed at an outer circumferential side of the opening portion 78 of the casing body 74. The screw clamp holes 108 are formed at the respective padding portions 110 so as to penetrate therethrough. The internal thread members 109 made of metal are provided at the respective screw clamp holes 108 by insert molding. Then, the screw members 128 (which will be explained later) are meshed with the respective internal thread members 109. A pair of engagement hooks 116 is formed at an upper outer circumferential side of the casing body 74 while an engagement portion 118 (see FIGS. 3 and 5) is formed at an outer periphery of the worm gear receiving portion 84 positioned at a lower outer circumferential side of the casing body 74.

The support projections 120 are formed at portions of the casing cover 76 facing the respective padding portions 110 so as to project in a direction opposite from the padding portions 110. The guide holes 126 penetrate through the respective support projections 120.

The screw members 128 are inserted into the respective support projections 120 from a side where the lower arm 8 is attached. The screw members 128 are meshed with the internal thread members 109 of the screw clamp holes 108 formed at the casing body 74 to thereby attach the speed reduction device 3 to the lower arm 8.

A pair of engagement arms 132 is formed at an upper outer circumferential side of the casing cover 76 so as to project towards the casing body 74 and to be engageable with the pair of engagement hooks 116 of the casing body 74. A strip-shaped engagement portion 134 is formed at a lower outer circumferential side of the casing cover 76 so as to project towards the casing body 74 and to be engageable with the engagement portion 118 of the casing body 74.

The two engagement projections (i.e., the upper and lower engagement projections) 76a formed at the casing cover 76 project towards the casing body 74. The upper engagement projection 76a engage with the upper second engagement portions 74b formed at the first and second vertical surfaces 74e and 74f respectively of the second fitting portion 74a in addition to the upper first engagement portion 64a of the first fitting portion 64 in a state where the first fitting portion 64 is fitted to the second fitting portion 74a so that the upper casing body-side engagement portions 74a overlap the upper first engagement portion 64a in the direction perpendicular to the output shaft 62a of the motor 62. In the same way, the lower engagement projection 76a engage with the lower second engagement portions 74b formed at the first and second vertical surfaces 74e and 74f respectively of the second fitting portion 74a in addition to the lower first engagement portion 64a of the first fitting portion 64 in a state where the first fitting portion 64 is fitted to the second fitting portion 74a so that the lower casing body-side engagement portions 74a overlap the lower first engagement portion 64a in the direction perpendicular to the output shaft 62a of the motor 62. A cross-sectional shape of each of the engagement projections 76a is substantially the same as the shape of the second engagement portion 74b and the shape of the first engagement portion 64a. The outer dimension of the engagement projection 76a is slightly smaller than that of the second engagement portion 74b or the first engagement portion 64a.

When the housing 68 of the motor 62 and the casing body 74 are fitted to each other and the casing cover 76 is tightened to the casing body 74, the upper and lower engagement projections 76a of the casing cover 76 penetrate through and engage with the upper and lower second engagement portions 74b and the upper and lower first engagement portions 64a in a state where the upper and lower second engagement portions 74b and the upper and lower first engagement portions 64a are arranged to overlap with each other in the direction perpendicular to the output shaft 62a of the motor 62. Accordingly, the motor 62 is prevented from being dislocated in the thrust direction of the output shaft 62a of the motor 62, thereby securely retaining the motor 62 at the casing body 74. At this time, because the first fitting portion 64 is fitted with a relatively small gap or press-fitted to the second fitting portion 74a, the motor 62 including the first fitting portion 64 is strongly supported by the casing body 74 including the second fitting portion 74a.

According to the first embodiment, each of the second engagement portions 74b is formed into a rectangular shape. At this time, each shape of the second engagement portions 74b may be modified as long as it is matching each shape of the first engagement portions 64a formed into the groove shape in cross section. Then, depending on such shape of the second engagement portion 74b, the shape of each of the engagement projections 76a of the casing cover 76 may be modified.

Next, an operation of the speed reduction device 3 having the aforementioned structure will be explained with reference to FIGS. 1 and 2. For example, in a case of raising the seat tilt apparatus 10, the motor 62 is driven so that a driving force thereof is transmitted via the speed reduction device 3 to the output pinion gear 102 which rotates accordingly (see FIG. 3). When the output pinion gear 102 rotates, the external gear 24a of the sector gear 24 meshed with the pinion gear 26 moves downward to thereby rotate the operation hole 60 of the sector gear 24 upward (i.e., the sector gear 24 rotates in the clockwise direction in FIG. 2). The swing link member 30, which is rotatably connected to the operation hole 60 at the connection hole 58, moves upward in association with the rotation of the sector gear 24.

On the other hand, the support hole 61 of the swing link member 30 is connected to the pivot bore 40 of the side frame plate 22. Thus, in association with the upward movement of the swing link member 30, the side frame plate 22 rotates upward about the rotation center bore 23. Then, when the side frame plate 22 rotates upward, the front edge panel 42 fixed to the side frame plate 22 and a front portion of the seat cushion move upward. The operation of the seat tilt apparatus 10 is thus achieved.

According to the aforementioned explanation, in the first embodiment, the first fitting portion 64 and the second fitting portion 74a are first fitted to each other and then the housing 68 of the motor 62 is assembled on the casing body 74. Next, when the casing cover 76 is tightened to the casing body 74, the engagement projections 76a formed at the casing cover 76 engage with the respective second engagement portions 74b of the casing body 74 in addition to the respective first engagement portions 64a so that the housing 68 is prevented from being dislocated from the casing body 74. According to such simple structure, the motor 62 is securely assembled on the speed reduction device 3 including the casing body 74 and the casing cover 76, which may result in an elimination of a screw member. Further, processes for forming an internal thread at the casing body 74, assembling a screw on the casing body 74, and the like may be eliminated to thereby achieve a reduction of a manufacturing cost.

In addition, according to the first embodiment, both the first and second shaft portions of the worm gear 72 are supported by the first and second bearing members 65a and 65b arranged within the casing body 74. Because bearing portions at both sides of the worm gear 72 obtained by the first and second bearing members 65a and 65b are realized within the casing body 74, the highly accurate coaxiality between the first and second bearing members 65a and 65b is easily obtained by a low cost. Accordingly, the stable rotation of the worm gear 72 is obtained. In addition, each of the bearing members 65a and 65b is provided at the cylindrical bore formed by a drill, and the like. Thus, the bearing members 65a and 65b securely support a load in the radial direction.

Further, according to the first embodiment, the second contact surface 72d of the second stepped portion 72b formed at the second shaft portion of the worm gear 72 and the end surface of the second bearing member 65b facing the motor 62 are in contact with each other while the end surface of the flange portion 65c of the second bearing member 65b facing the motor 62 and the end surface of the projecting end portion 64d serving as the cylindrical fitting portion are in contact with each other. Then, the worm gear 72 is restricted from moving towards the motor 62 and is positioned appropriately. Such simple structure achieves the worm gear 72 arranged in an appropriate position and a reduction of the manufacturing cost Furthermore, according to the first embodiment, both the casing body 74 and the casing cover 76 are made of lightweight resin, thereby reducing overall weight and cost of the speed reduction device 3.

A second embodiment will be explained below. The second embodiment differs from the first embodiment in the first and second fitting portions of the motor fixation device. The differences of the second embodiment from the first embodiment will be only explained below. Explanations of effects and structures of the second embodiment same as those of the first embodiment will be omitted. Further, the same components between the first and second embodiments bear the same reference numerals in the drawings.

Figure 7:
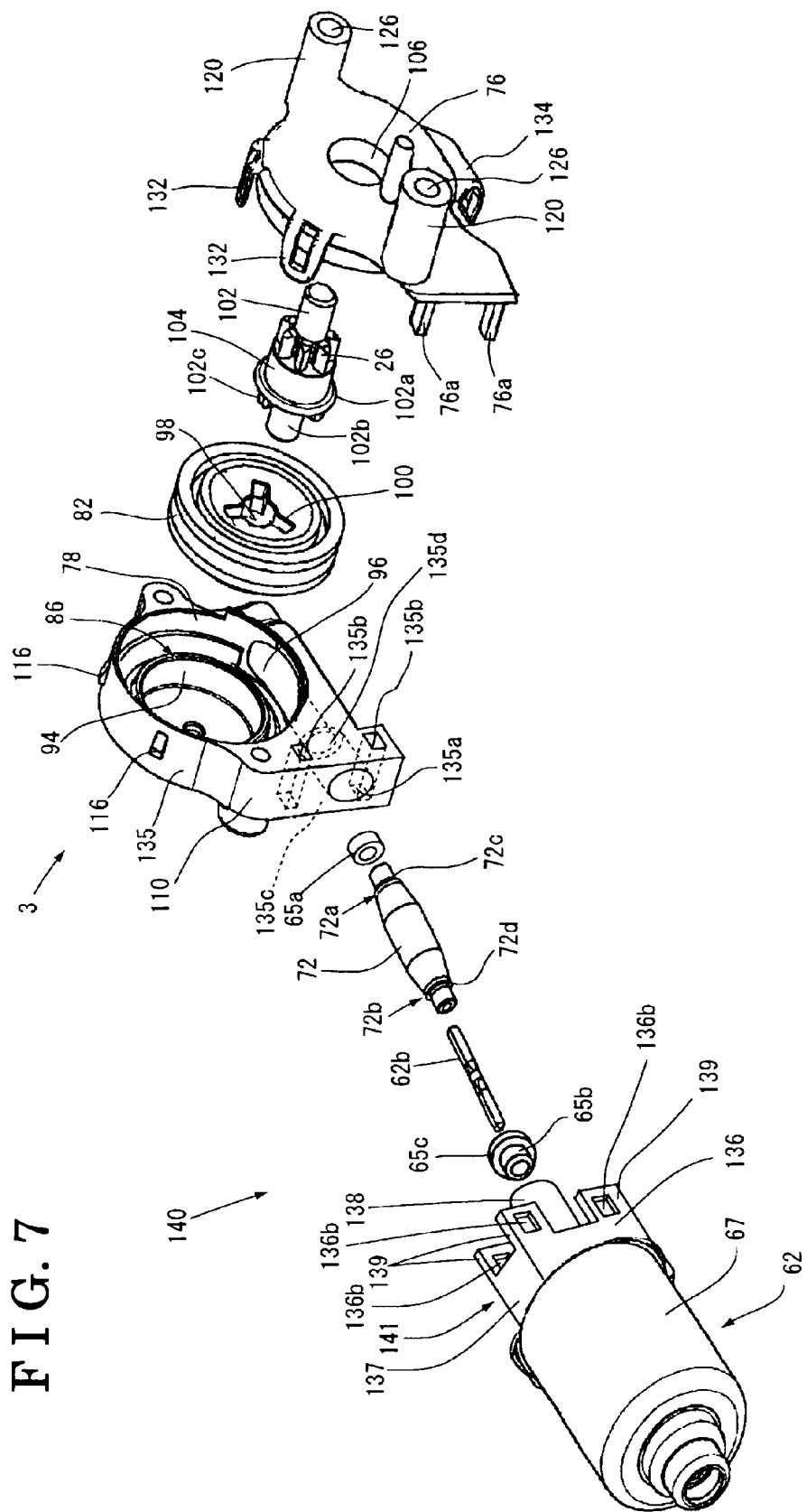
FIG. 7 is an exploded perspective view of the speed reduction device according to a second embodiment disclosed here.
Figure 8:
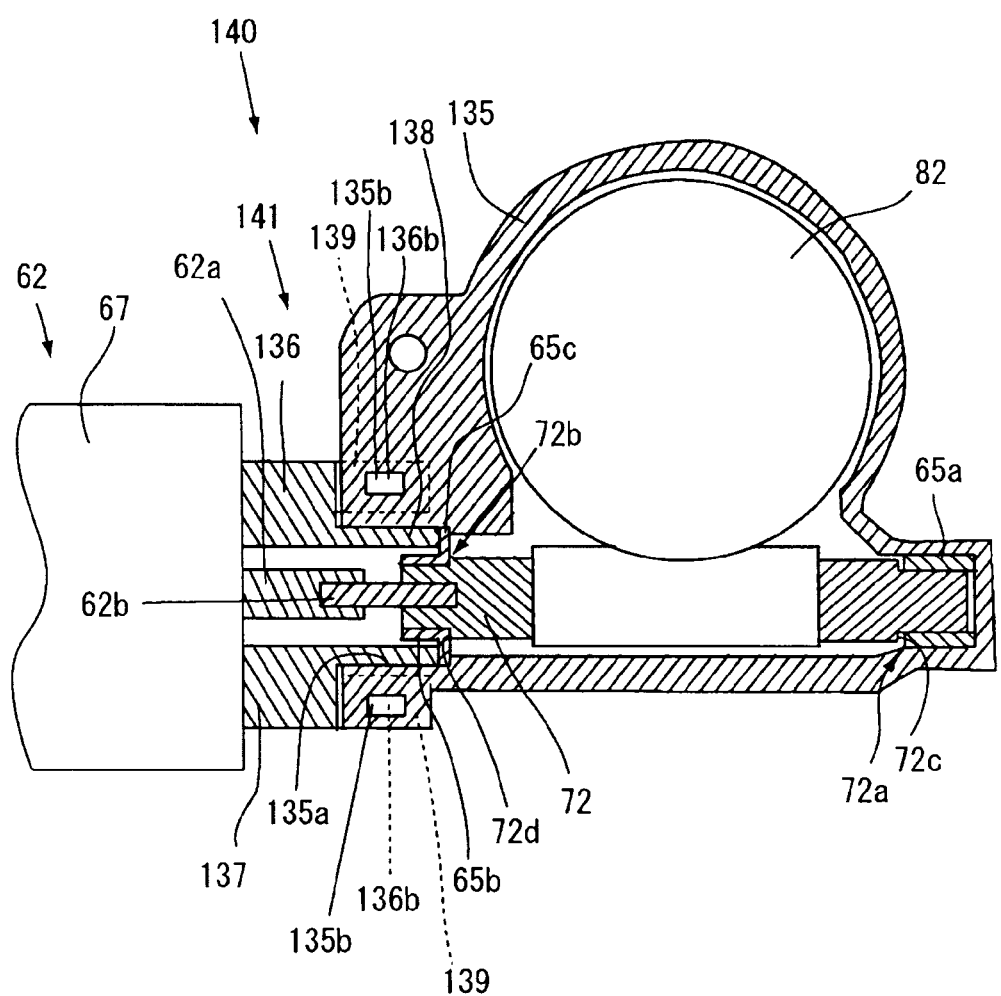
FIG. 8 is a cross-sectional view of the motor fixation device according to the second embodiment disclosed here.

As illustrated in FIGS. 7 and 8, a second fitting portion 135a of a motor fixation device 140 is a cylindrical fitting hole formed at a casing body 135. A first fitting portion 141 provided at a housing 136 includes a fitting protrusion 137 and a cylindrical fitting portion 138 formed at an end of the fitting protrusion 137. The fitting protrusion 137 is formed into substantially a rectangular solid shape. In the second embodiment, the padding portion 110 also serves as the second fitting portion.

Four lock portions 139 are formed at corners of respective surfaces of the fitting protrusion 137 in such a manner to project towards the casing body 135 by a predetermined amount. Specifically, two of the lock portions 139 each formed into a plate shape extend from one vertical surface of the fitting protrusion 137 towards the casing body 135 while another two of the lock portions 139 each formed into a plate shape extend from the other vertical surface of the fitting protrusion 137 towards the casing body 135. The two lock portions 139 that extend from one vertical surface and the two lock portions 139 that extend from the other vertical surface are in parallel to each other. First engagement portions 136b are formed so as to penetrate through the respective lock portions 139 in a direction perpendicular to the output shaft 62a of the motor 62. The shape of each of the first engagement portions 136b is the same as that of the second engagement portion 74b according to the first embodiment. The cylindrical fitting portion 138 projects by a predetermined amount so as to be coaxial with the output shaft 62a of the motor 62 from the end surface of the fitting protrusion 137. The cylindrical fitting portion 138 is fitted to the second fitting portion 135a formed at the casing body 135 to thereby achieve the positioning and support of the motor 62 relative to the casing body 135.

When the cylindrical fitting portion 138 is fitted to the second fitting portion 135a, the four lock portions 139 are arranged outside of vertical side surfaces 135c and 135d of the casing body 135. Two second engagement portions 135b are formed to penetrate through the vertical side surfaces 135c and 135d in a direction perpendicular to the output shaft 62a of the motor 62 so as to overlap the first engagement portions 136b in the direction perpendicular to the output shaft 62a of the motor 62. The shape of each of the second engagement portions 135b is the same as that of the first engagement portion 136b.

In a case where the casing cover 76 is tightened to the casing body 135, the engagement projections 76a formed at the casing cover 76 engage with the first engagement portions 136b formed at one vertical surface of the fitting protrusion 137 positioned close to the casing cover 76, the second engagement portions 135b, and finally the first engagement portions 136b formed at the other vertical surface of the fitting protrusion 137 positioned away from the casing cover 76. Accordingly, the motor 62 is prevented from being dislocated in the thrust direction of the output shaft 62a. The second embodiment obtains the same effect as the first embodiment.

According to the second embodiment, a simple structure where the cylindrical fitting portion 138 of the housing 136 projecting so as to be coaxial with the output shaft 62a of the motor 62 is fitted to the second fitting portion 135a serving as the cylindrical fitting hole achieves the secure assembly of the housing 136 on the casing body 135. As a result, a further reduced manufacturing cost and the easy fixing device are obtained.

According to the aforementioned first and second embodiments, the casing body 74, 135 and the casing cover 76 are made of ABS resin. Alternatively, the casing body 74, 135 and the casing cover 76 may be made of reinforced fiber such as glass fiber and aramid fiber.

According to the aforementioned first and second embodiments, the speed reduction device is applied to the seat tilt apparatus. Alternatively, the speed reduction device may be applicable to a slide mechanism of a seat apparatus for a vehicle, and the like.

According to the aforementioned embodiments, the first fitting portion 64, 141 (138) is fitted to the second fitting portion 74a, 135a and thereafter the housing 68, 136 of the motor 62 is assembled on the casing body 74, 135. When the casing cover 76 is tightened to the casing body 74, 135, the engagement projections 76a formed at the casing cover 76 engage with the second engagement portions 74b, 135b of the casing body 74, 135 and the first engagement portions 64a, 136b to thereby prevent the housing 68, 136 from dislocating from the casing body 74, 135. According to such simple structure, the motor 62 is securely assembled on the casing without a screw, which may result in an elimination of a screw member. Further, processes for forming an internal thread at the casing body 74, 135, assembling a screw on the casing body 74, 135, and the like may be eliminated to thereby achieve a reduction of a manufacturing cost.

The second fitting portion 74a formed at the casing body 74 includes the fitting hole while the first fitting portion 64 provided at the housing 68 includes a fitting protrusion fitted to the fitting hole 74a in a manner that the fitting protrusion is prevented from rotating relative to the fitting hole, and the cylindrical fitting portion 64d is formed at an end of the fitting protrusion in a projecting manner and in a coaxial manner with the output shaft 62a of the motor 62, the cylindrical fitting portion 64d being fitted to the cylindrical fitting bore 74g that is formed at the casing body 74 in a coaxial manner with the output shaft 62a of the motor 62 at an end portion of the fitting hole away from the motor 62.

The second fitting portion formed at the casing body 135 includes the padding portion 110 while the first fitting portion 141 provided at the housing 136 includes the lock portion 139 fitted to the padding portion 110 in a manner that the lock portion 139 is prevented from rotating relative to the padding portion 110, and the cylindrical fitting portion 138 is formed at an end of the lock portion 139 in a projecting manner and in a coaxial manner with the output shaft 62a of the motor 62, the cylindrical fitting portion 138 being fitted to the cylindrical fitting hole 135a formed at the casing body in a coaxial manner with the output shaft 62a of the motor 62.

According to such simple structure that the cylindrical fitting portion 64d, 138 of the housing 68, 136 is fitted to the cylindrical fitting bore 74g, 135a formed in a projecting manner and in a coaxial manner with the output shaft 62a of the motor 62, the housing 68, 136 is assembled on the casing body 74, 135. The simple-shaped fitting portion 64d, 138 may lead to a reduced cost.

The speed reduction device 3 further includes the bearing members 65a, 65b disposed at the casing body 74, 135 and rotatably supporting the first shaft portion and the second shaft portion of the worm gear 72 respectively.

Because bearing portions at both sides of the worm gear 72 obtained by the first and second bearing members 65a and 65b are realized within the casing body 74, the highly accurate coaxiality between the first and second bearing members 65a and 65b is easily obtained by a low cost and a stable rotation of the worm gear 72 is obtained.

One of the first shaft portion and the second shaft portion of the worm gear 72 includes the stepped portion 72b in contact with an end surface of one of the bearing members 65b positioned closer to the motor 62 relative to the other of the bearing members 65a, and the flange portion 65c formed at the one of the bearing members 65b is in contact with an end surface of the cylindrical fitting portion 64d so that the worm gear 72 is restricted from moving towards the motor 62.

Therefore, the worm gear 72 is restricted to move towards the motor 62 and is appropriately positioned. The positioning of the worm gear 72 is obtained by such simple structure to thereby achieve a reduction of the manufacturing cost.

The casing body 74, 135 and the casing cover 76 are formed by a resin material.

As a result, a reduction of overall weight and cost of the speed reduction device 3 is achieved.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A speed reduction device for a power seat adapted to be fixed to a seat frame, the speed reduction device comprising:
   a worm gear coaxially and integrally rotating with an output shaft of a motor:
   a helical gear meshed with the worm gear and coaxially and integrally rotating with a drive shaft driving a movable portion of the power seat;
   a casing including a casing body rotatably supporting the worm gear and including a circular-shaped opening portion through which the helical gear is inserted, the casing including a casing cover tightened to the casing body and closing the opening portion of the casing body, the casing being fixed to a housing of the motor; and
   a motor fixation device including;
      a first fitting portion provided at the housing and surrounding the output shaft of the motor,
      a first engagement portion formed at the first fitting portion in a direction perpendicular to the output shaft of the motor,
      a second fitting portion formed at the casing body and to which the first fitting portion is fitted,
      a second engagement portion formed at the second fitting portion in a direction perpendicular to the output shaft of the motor and arranged to overlap the first engagement portion in a direction perpendicular to the output shaft of the motor in a case where the first fitting portion is fitted to the second fitting portion, and
      an engagement projection formed at the casing cover and engaging with the first engagement portion and the second engagement portion in a case where the casing cover is tightened to the casing body.

2. The speed reduction device according to claim 1, wherein the second fitting portion formed at the casing body includes a fitting hole while the first fitting portion provided at the housing includes a fitting protrusion fitted to the fitting hole in a manner that the fitting protrusion is prevented from rotating relative to the fitting hole, and a cylindrical fitting portion is formed at an end of the fitting protrusion in a projecting manner and in a coaxial manner with the output shaft of the motor, the cylindrical fitting portion being fitted to a cylindrical fitting bore that is formed at the casing body in a coaxial manner with the output shaft of the motor at an end portion of the fitting hole away from the motor.

3. The speed reduction device according to claim 2, wherein the casing body and the casing cover are formed by a resin material.

4. The speed reduction device according to claim 2, further comprising bearing members disposed at the casing body and rotatably supporting a first shaft portion and a second shaft portion of the worm gear respectively.

5. The speed reduction device according to claim 4, wherein the casing body and the casing cover are formed by a resin material.

6. The speed reduction device according to claim 4, wherein one of the first shaft portion and the second shaft portion of the worm gear includes a stepped portion in contact with an end surface of one of the bearing members positioned closer to the motor relative to the other of the bearing members, and a flange portion formed at the one of the bearing members is in contact with an end surface of the cylindrical fitting portion so that the worm gear is restricted from moving towards the motor.

7. The speed reduction device according to claim 6, wherein the casing body and the casing cover are formed by a resin material.

8. The speed reduction device according to claim 1, wherein the casing body and the casing cover are formed by a resin material.

9. The speed reduction device according to claim 1, wherein the second fitting portion formed at the casing body includes a padding portion while the first fitting portion provided at the housing includes a lock portion fitted to the padding portion in a manner that the lock portion is prevented from rotating relative to the padding portion, and a cylindrical fitting portion is formed at an end of the lock portion in a projecting manner and in a coaxial manner with the output shaft of the motor, the cylindrical fitting portion being fitted to a cylindrical fitting hole formed at the casing body in a coaxial manner with the output shaft of the motor.

10. The speed reduction device according to claim 9, wherein the casing body and the casing cover are formed by a resin material.

11. The speed reduction device according to claim 9, further comprising bearing members disposed at the casing body and rotatably supporting a first shaft portion and a second shaft portion of the worm gear respectively.

12. The speed reduction device according to claim 11, wherein the casing body and the casing cover are formed by a resin material.

13. The speed reduction device according to claim 11, wherein one of the first shaft portion and the second shaft portion of the worm gear includes a stepped portion in contact with an end surface of one of the bearing members positioned closer to the motor relative to the other of the bearing members, and a flange portion formed at the one of the bearing members is in contact with an end surface of the cylindrical fitting portion so that the worm gear is restricted from moving towards the motor.

14. The speed reduction device according to claim 13, wherein the casing body and the casing cover are formed by a resin material.

* * * * *